(12) United States Patent
Tanaka

(10) Patent No.: US 8,625,120 B2
(45) Date of Patent: Jan. 7, 2014

(54) IMAGE FORMING APPARATUS HAVING A CPU UTILIZATION MONITORING FOR MONITORING THE READING PROCESSING AND/OR PRINT PROCESSING

(75) Inventor: Kenji Tanaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 135 days.

(21) Appl. No.: 13/401,273

(22) Filed: Feb. 21, 2012

(65) Prior Publication Data

US 2012/0212764 A1  Aug. 23, 2012

(30) Foreign Application Priority Data

Feb. 23, 2011  (JP) ................. 2011-036678

(51) Int. Cl.
*G06F 3/12* (2006.01)
*H04N 1/00* (2006.01)

(52) U.S. Cl.
USPC .................................. 358/1.13; 358/1.15

(58) Field of Classification Search
USPC .......... 358/1.1, 1.5, 19, 1.13, 1.14, 1.15, 474, 358/402, 409; 399/8, 31, 37
See application file for complete search history.

(56) References Cited

U.S. PATENT DOCUMENTS

| | | | | |
|---|---|---|---|---|
| 7,903,272 B2 * | 3/2011 | Kato | | 358/1.15 |
| 2006/0129912 A1 | 6/2006 | Kunori | | |
| 2008/0239378 A1 * | 10/2008 | Uno | | 358/1.15 |
| 2008/0247673 A1 | 10/2008 | Kirihara et al. | | |
| 2008/0294816 A1 | 11/2008 | Fuji | | |
| 2009/0172142 A1 | 7/2009 | Hanai et al. | | |
| 2009/0207449 A1 * | 8/2009 | Johnson et al. | | 358/1.15 |

FOREIGN PATENT DOCUMENTS

| | | |
|---|---|---|
| JP | 2000-039930 | 2/2000 |
| JP | 2006-192878 | 7/2006 |
| JP | 2007-096835 | 4/2007 |
| JP | 2007-188226 | 7/2007 |
| JP | 2007-312106 | 11/2007 |
| JP | 2008-258985 | 10/2008 |
| JP | 2008-292542 | 12/2008 |
| JP | 2009-157785 | 7/2009 |
| JP | 2011-023918 | 2/2011 |

* cited by examiner

*Primary Examiner* — Gabriel Garcia
(74) *Attorney, Agent, or Firm* — Edwards Wildman Palmer LLP; David G. Conlin; Steven M. Jensen

(57) ABSTRACT

An MFP is provided with a scanner unit for optically reading a document image; a printer unit for printing image data; a CPU for controlling operation of the MFP according to an operating condition related to reading processing by the scanner unit and/or print processing by the printer unit; a CPU utilization monitoring portion for monitoring utilization of the CPU at the time of performing the reading processing and/or the print processing; and an operating condition restriction portion for restricting, when CPU utilization that is monitored by the CPU utilization monitoring portion is a predetermined value or more, the operating condition related to the reading processing and/or the print processing according to the CPU utilization.

5 Claims, 4 Drawing Sheets

FIG. 2

| | PROCESSING DETAIL | CPU UTILIZATION (%) |
|---|---|---|
| 1 | PREVIEW | HIGH(40) |
| 2 | UI ANIMATION | HIGH(40) |
| 3 | RASTER DATA CONVERSION PROCESSING | HIGH(40) |
| 4 | SIMPLE EDITING PROCESSING | HIGH(40) |
| 5 | FILING DATA SEARCH PROCESSING | MODERATE(20) |
| 6 | FILING DATA REPRINT PROCESSING | MODERATE(20) |
| 7 | COPY PROCESSING | MODERATE(30) |
| 8 | SCAN PROCESSING | MODERATE(20) |
| 9 | PRINT PROCESSING | LOW(10) |
| 10 | WEB ACCESS RESPONSE | LOW(10) |
| 11 | OTHERS | LOW(10) |

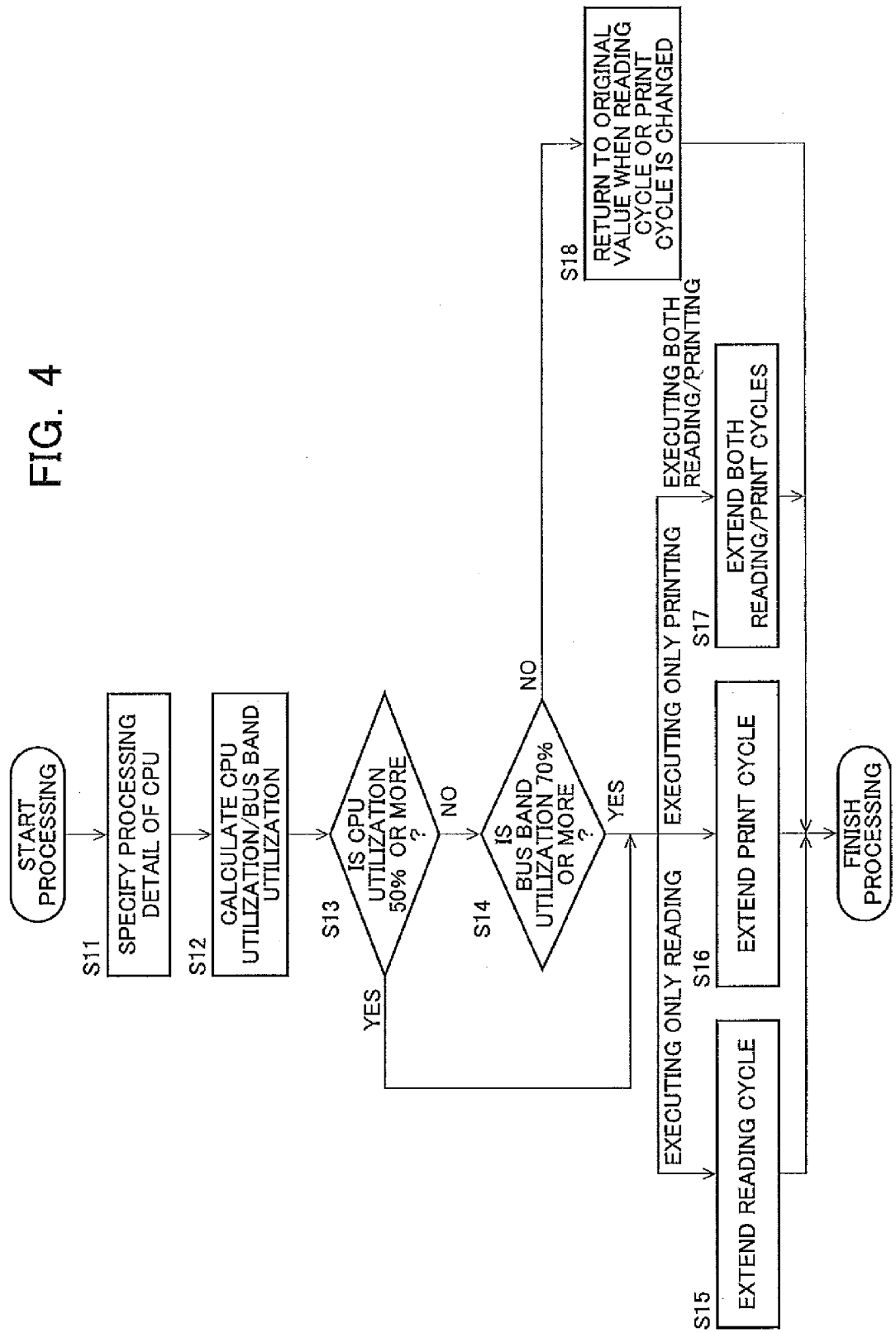

IMAGE FORMING APPARATUS HAVING A CPU UTILIZATION MONITORING FOR MONITORING THE READING PROCESSING AND/OR PRINT PROCESSING

CROSS-NOTING PARAGRAPH

This non-provisional application claims priority under 35 U.S.C. §119(a) on Patent Application No. 2011-036678 filed in JAPAN on Feb. 23, 2011, the entire contents of which are hereby incorporated herein by reference.

FIELD OF THE INVENTION

The present invention relates to an image forming apparatus, and more particularly to an image forming apparatus including a reading portion for optically reading a document image and a printing portion for printing image data.

BACKGROUND OF THE INVENTION

Recently, an image forming apparatus such as an MFP (digital Multi Function Peripheral) has been commercially available such that a display screen equipped with a touch panel as a user interface (hereinafter, also referred to as UI) is made larger with various functions such as a preview function which are easier to be used and improved so as to be easily viewable. With the trend toward high functionality or multi-functionality for the MFP in this manner, a load on a CPU provided in the MFP of course increases.

When processing ability of the CPU becomes insufficient, operation of the MFP is suppressed so that a user gets stressed because, for example, preview display is not smoothly performed, scan performance is degraded, or the like. In this case, a high-performance CPU with high processing ability is attached to the MFP so as to be able to attempt load reduction, however, the high-performance CPU is generally expensive, thus causing cost increases of the MFP. Therefore, various techniques for effectively using the CPU without stressing a user out have been proposed.

For example, Japanese Laid-Open Patent Publication No. 2000-39930 describes an electronic device for monitoring a load on a CPU to change a clock. Such an electronic device is provided with a VCXO circuit capable of dynamically controlling a clock frequency; a CPU portion which operates with the clock; a program memory portion in which a program to operate is stored; and a program monitor control portion which optimally controls the clock by monitoring a progress state of the program, thereby being constituted so as to dynamically change the clock according to a software load of the CPU portion.

Here, in the case of processing a job with a high CPU load in the MFP, CPU utilization becomes nearly 100% in some cases. In this case, the CPU is occupied by the job processing, thus influencing operation of a UI in the MFP. For example, responsiveness of the UI is degraded so that preview display is stopped on the way, operation of screen switching and the like become awkward, or the like, thus heavily stressing a user out with such a state which is directly visible. Moreover, to the contrary, placing priority on the operation of the UI influences processing of a job with a high load, thereby, for example, temporarily stopping print processing by a printer or reading processing by a scanner, or the like, thus stressing the user out also in this case.

For addressing such a problem, with the technique described in Japanese Laid-Open Patent Publication No. 2000-39930, the clock is dynamically changed according to the load of the CPU, and operation of the clock is of course restricted. Therefore, in the case of exceeding restriction of the clock, it is impossible to suppress degradation of responsiveness of the UI without temporarily stopping the reading processing or the printing processing. Accordingly, the above-described problem is not solved with the technique of Japanese Laid-Open Patent Publication No. 2000-39930.

SUMMARY OF THE INVENTION

An object of the present invention is to provide an image forming apparatus capable of suppressing degradation of responsiveness of a UI without temporarily stopping reading processing or print processing in the case of becoming a high load on a CPU.

An object of the present invention is to provide an image forming apparatus including a reading portion for optically reading a document image and a printing portion for printing image data, comprising: a CPU for controlling operation of the image forming apparatus according to an operating condition related to reading processing by the reading portion and/or print processing by the printing portion; a CPU utilization monitoring portion for monitoring utilization of the CPU at the time of performing the reading processing and/or the print processing; and an operating condition restriction portion for restricting, when CPU utilization that is monitored by the CPU utilization monitoring portion is a predetermined value or more, the operating condition related to the reading processing and/or the print processing according to the CPU utilization.

Another object of the present invention is to provide the image forming apparatus, wherein a CPU utilization table in which a processing detail is associated with the CPU utilization in the image forming apparatus is provided, and the CPU utilization monitoring portion calculates, based on a processing detail of the image forming apparatus at the time of performing the reading processing and/or the print processing, the CPU utilization corresponding to the processing detail with reference to the CPU utilization table.

Another object of the present invention is to provide the image forming apparatus, wherein a bus that is connected to the CPU and a bus band utilization monitoring portion for monitoring band utilization of the bus at the time of performing the reading processing and/or the print processing are provided, and the operating condition restriction portion restricts, when the CPU utilization is less than the predetermined value and bus band utilization that is monitored by the bus band utilization monitoring portion is a predetermined value or more, an operating condition related to the reading processing and/or the print processing according to the bus band utilization.

Another object of the present invention is to provide the image forming apparatus, wherein restriction of the operating condition related to the reading processing and/or the print processing is to extend a reading cycle in the reading processing and/or a print cycle in the print processing with respect to a default value.

Another object of the present invention is to provide the image forming apparatus, wherein the operating condition restriction portion differentiates the amount for extending the reading cycle in a case where the reading cycle is extended between the case of extending only the reading cycle and the case of extending both the reading cycle and the print cycle.

BRIEF DESCRIPTION OF THE DRAWINGS

FIG. 2 is a diagram showing an example of a CPU utilization table in which a processing detail is associated with the CPU utilization in an MFP;

FIG. 4 is a flowchart for explaining an example of a method of controlling a CPU load and a bus load in the MFP of the present invention.

PREFERRED EMBODIMENTS OF THE INVENTION

Hereinafter, preferred embodiments according to an image forming apparatus of the present invention will be described with reference to accompanying drawings.

Figure 1:
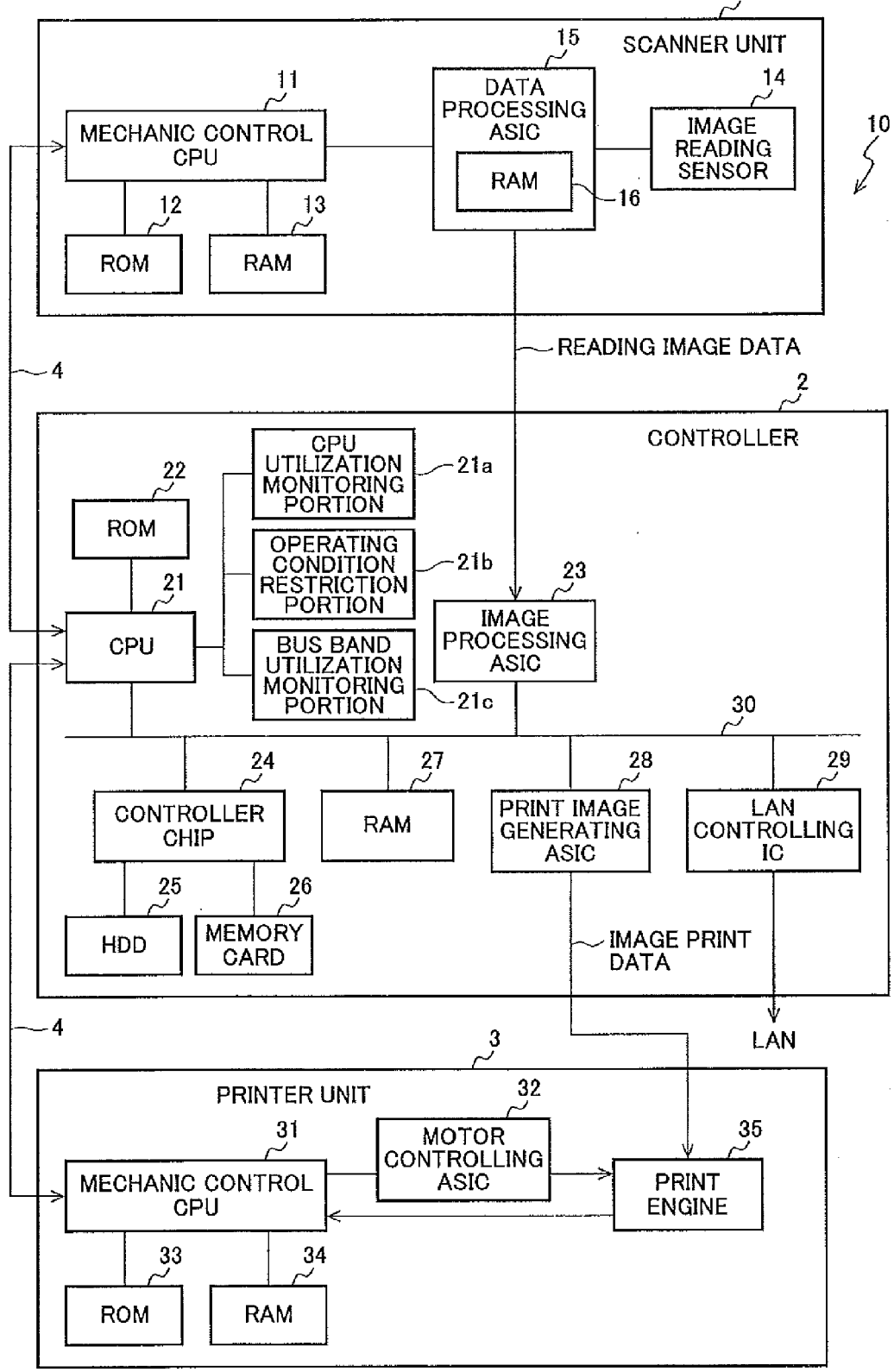
FIG. 1 is a block diagram showing a configuration example of an image forming apparatus according to an embodiment of the present invention.

FIG. 1 is a block diagram showing a configuration example of an image forming apparatus according to an embodiment of the present invention, and a reference number 10 indicates an image forming apparatus in the diagram. This image forming apparatus 10 is configured as a digital multi function peripheral (MFP) including functions of a scanner, copy, a printer, facsimile and the like. The image forming apparatus 10 (hereinafter, referred to as MFP 10) is mainly provided with a scanner unit 1, a controller 2 and a printer unit 3. The controller 2 is connected to the scanner unit 1 and the printer unit 3 via a serial line 4, and controls operation of the scanner unit 1 and the printer unit 3.

The scanner unit 1 corresponds to a reading portion of the present invention for optically reading a document image. The scanner unit 1 is provided with a mechanic control CPU 11 for controlling hardware (mechanic part), a ROM 12 serving as a nonvolatile memory for storing a control program of the scanner unit 1, a RAM 13 as a volatile memory serving as an execution area of the control program, an image reading sensor 14 such as a CCD (Charge Coupled Device) for reading the document image, a data processing ASIC (Application Specific Integrated Circuit) 15 for performing processing of image data in which the document image is read and input by the image reading sensor 14, and a RAM 16 serving as an execution area of a program in the data processing ASIC 15.

The controller 2 is provided with a CPU 21 which is connected to the scanner unit 1 and the printer unit 3 via the serial line 4 to control operation of the MFP 10, a ROM 22 for storing a control program for the entire MFP 10, an image processing ASIC 23 for applying predetermined image processing to read image data that is input from the scanner unit 1, a controller chip 24 for connecting an HDD (hard disc drive) 25 and a memory card 26 to control input/output thereof, the HDD 25 and the memory card 26 for recording image data and the like, a RAM 27 serving as an execution area of the control program, a print image generating ASIC 28 for generating image print data that is output to the printer unit 3, a LAN controlling IC 29 for controlling a network such as a LAN, and a bus 30 for connecting these portions, respectively.

The printer unit 3 corresponds to a printing portion of the present invention for printing image data. The printer unit 3 is provided with a mechanic control CPU 31 for controlling hardware (mechanic part), a motor controlling ASIC 32 for performing driving control of a motor in a printing engine 35, a ROM 33 for storing a control program of the printer unit 3, a RAM 34 serving as an execution area of the control program and the printing engine 35 composed of hardware such as an LSU (Laser Scanning Unit) for printing, which performs printing based on image print data that is input from the controller 2.

A main characterizing portion of the present invention is that degradation of responsiveness of a UI is suppressed without temporarily stopping reading processing and print processing in the case of becoming a high load on a CPU. As a configuration for such operation, the MFP 10 is provided with a CPU 21 for controlling operation of the MFP 10 according an operation condition related to reading processing by the scanner unit 1 and/or print processing by the printer unit 3, a CPU utilization monitoring portion 21a for monitoring utilization of the CPU 21 at the time of performing reading processing and/or print processing, and an operating condition restriction portion 21b for restricting the operating condition related to the reading processing and/or the print processing according to CPU utilization when the CPU utilization that is monitored by the CPU utilization monitoring portion 21a is a predetermined value or more. Hereinafter, the CPU utilization represents the usage rate of the CPU 21.

Additionally, the MFP 10 is provided with the bus 30 that is connected to the CPU 21 and a bus band utilization monitoring portion 21c for monitoring band utilization of the bus 30 at the time of performing the reading processing and/or the print processing. When the CPU utilization is less than a predetermined value, and a bus band utilization that is monitored by the bus band utilization monitoring portion 21c is a certain value or more, the operating condition restriction portion 21b may restrict the operating condition related to the reading processing and/or the print processing according to the bus band utilization.

Note that, the CPU utilization monitoring portion 21a, the operating condition restriction portion 21b and the bus band utilization monitoring portion 21c are realizable as a part of functions of the CPU 21, and a program for executing the CPU utilization monitoring portion 21a, the operating condition restriction portion 21b and the bus band utilization monitoring portion 21c is stored in the ROM 22 or the HDD 25. Then, the CPU 21 is able to execute the program by retrieving it from the ROM 22 or the HDD 25 to the RAM 27 at the time of executing the program.

FIG. 2 is a diagram showing an example of a CPU utilization table in which a processing detail is associated with the CPU utilization in the MFP 10. The CPU utilization table is stored in the ROM 22, and referenced as appropriate by the CPU utilization monitoring portion 21a. A preview is processing for performing image processing of filing data for displaying on an operation screen, in which the CPU utilization is about 40%. Additionally, UI animation is processing for displaying animation in operation, in which the CPU utilization is about 40%. Further, raster data conversion processing is processing for converting print data into raster data, in which the CPU utilization is about 40%. Moreover, simple editing processing is processing for editing preview data on the operation screen, in which the CPU utilization is about 40%. Such processing has relatively-high CPU utilization and may be processing with a high CPU load.

Further, filing data search processing is processing for searching filing data according to a search condition specified by a user, in which the CPU utilization is about 20%. Additionally, filing data reprint processing is processing for performing image processing at the time of reprinting filing data. Furthermore, copy processing is processing for performing reading processing and image processing while performing print processing of a document image, in which the CPU utilization is about 30%. Moreover, scan processing is processing for performing reading processing and image processing but not performing printing of the document image, in which the CPU utilization is about 20%. Such processing may be processing with a moderate CPU load.

Further, print processing is processing for printing image data that was subjected to reading processing and image processing, in which the CPU utilization is about 10%. Additionally, a Web access response is processing for accessing to a Web site on the Internet, in which the CPU utilization is about 10%. Furthermore, others are processing other than each processing described above, in which the CPU utilization is about 10%. Such processing has relatively-low CPU utilization, and may be processing with a low CPU load.

The CPU utilization monitoring portion 21a calculates, based on a processing detail of the MFP 10 at the time of performing scan processing and/or print processing, the CPU utilization corresponding to the processing detail with reference to the CPU utilization table of FIG. 2. For example, independent scan processing has the CPU utilization of 20%, independent print processing has the CPU utilization of 10%, and copy processing with a combination of the scan processing and the print processing has the CPU utilization of 30%. In this case, when other processing such as preview display is performed, the CPU utilization for covering such processing may be added. For example, in the case of performing the print processing with the CPU utilization of 10% during the preview display with the CPU utilization of 40%, the CPU utilization is calculated as 50%.

When the CPU utilization that is monitored (calculated) by the CPU utilization monitoring portion 21a is a predetermined value (for example, 50%) or more, the operating condition restriction portion 21b restricts an operating condition related to the scan processing and/or the print processing according to the CPU utilization. This makes it possible to reduce the CPU load. As a method of restricting the operating condition, for example, it is expected that a reading cycle in the scan processing and/or a print cycle in the print processing are extended with respect to each default value (default cycle). The reading cycle that is referred here means a processing latency time (interval) between respective pages (between sheets) at the time of reading a document, and the print cycle means a processing latency time (interval) between respective pages (between sheets) at the time of printing image data on a recording sheet. These cycles are extended so that it is possible to have an interval between data that is input to the CPU 21 and data that is output from the CPU 21, thus making it possible to disperse a load on the CPU 21 to reduce the CPU utilization.

Specifically, a reading cycle table in which the CPU utilization is associated with the reading cycle is stored in the ROM 22. For example, the CPU utilization is divided into five phases of: 50% or more and less than 60%; 60% or more and less than 70%; 70% or more and less than 80%; 80% or more and less than 90%; and 90% or more and 100% or less, for which, the reading cycles A, B, C, D and E corresponding to each phase are allocated in this order (in order of A>B>C>D>E, in which A is the longest cycle). Then, the operating condition restriction portion 21b is able to specify, based on the CPU utilization that is monitored by the CPU utilization monitoring portion 21a, the reading cycle corresponding to the CPU utilization with reference to the reading cycle table. For example, the CPU utilization of 65% is specified as the reading cycle "D".

In the case described above, a correspondence relationship of the CPU utilization and the reading cycle is able to be decided in advance based on actual measurement. Specifically, when the CPU utilization of each phase described above is attempted to be reduced to a predetermined CPU utilization (for example, 40%), it is expected that the reading cycle required for this attempt is actually measured for each phase.

Further, also in the case of the print cycle, as with the above-described reading cycle, a print cycle table in which the CPU utilization is associated with the print cycle is stored in the ROM 22. Then, the operating condition restriction portion 21b is able to specify, based on the CPU utilization that is monitored by the CPU utilization monitoring portion 21a, the print cycle corresponding to the CPU utilization with reference to the print cycle table. Note that, each of the reading cycle and the print cycle has a set default value different from each other, and is configured to be operated with the default value without restricting operation when the CPU utilization is less than a predetermined value.

Further, when the copy processing with a combination of the scan processing and the print processing is performed, both the reading cycle and the print cycle may be extended. Also in this case, as described above, a reading cycle/print cycle table in which the CPU utilization is associated with the reading cycle and the print cycle is stored in the ROM 22. Then, the operating condition restriction portion 21b is able to specify, based on the CPU utilization that is monitored by the operating condition restriction portion 21b, the reading cycle and the print cycle according to the CPU utilization with reference to the reading cycle/print cycle table.

Here, in a case where the reading cycle is extended, the amount for extending the reading cycle may be differentiated between the case of the scan processing in which only the reading cycle is extended and the case of the copy processing in which both the reading cycle and the print cycle are extended. Further, similarly, in a case where the print cycle is extended, the amount for extending the print cycle may be differentiated between the case of the print processing in which only the print cycle is extended and the case of the copy processing in which both the reading cycle and the print cycle are extended.

In the case described above, when the CPU utilization (for example, 50%) that is monitored by the CPU utilization monitoring portion 21a is attempted to be reduced to predetermined CPU utilization (for example, 40%), it is expected that, between the case of extending both the reading cycle and the print cycle and the case of extending the reading cycle independently, it is possible to reduce a change amount in the reading cycle when both of them are extended compared to the reading cycle in the case of being extended independently. Accordingly, for the reading cycle, a less change amount in the case of extending both the reading cycle and the print cycle is reduced compared to the change amount in the case of extending only the reading cycle. Additionally, also for the print cycle, similarly, it is expected that, between the case of extending both the reading cycle and the print cycle and the case of extending the print cycle independently, it is possible to reduce a less change amount in the print cycle when both of them are extended compared to the print cycle in the case of being extended independently. Accordingly, for the print cycle, a less change amount in the case of extending both the reading cycle and the print cycle is reduced compared to the change amount in the case of extending only the print cycle. In this manner, the change amount of the cycle is reduced so that it is possible to reduce the CPU load while each processing is performed quickly.

Further, when the CPU utilization that is monitored by the CPU utilization monitoring portion 21a is less than a predetermined value, and the bus band utilization that is monitored by the bus band utilization monitoring portion 21c is a certain value or more, the operating condition restriction portion 21b may restrict the operating condition related to the reading processing and/or the print processing according to the bus band utilization. This is because the case is assumed where data is not able to be flowed and processing of the MFP 10 is retarded in the case of having an insufficient bus band even in the case of a sufficiently low load. Consequently, transitions of the bus band utilization of the bus 30 are monitored/calculated so that operation related to the reading processing and/or the print processing are restricted according to the bus band utilization when the bus band utilization is the certain value or more. It is expected that the way of restricting the operation at the time is to extend the reading cycle in the reading processing and/or the print cycle in the print processing with respect to the default value as with the case of the CPU.

In the case described above, a correspondence relationship of the bus band utilization and the reading cycle and/or the print cycle is able to be decided in advance based on actual measurement. Specifically, when the bus band utilization of each phase described above is attempted to be reduced to a predetermined bus band utilization (for example, 50%), it is expected that the reading cycle and/or the print cycle required for this attempt is actually measured for each phase.

Note that, it is expected that, even when the reading cycle or the print cycle is extended as described above to have an interval between pages, a data amount that is transferred per unit time is not changed, thus making impossible to sufficiently reduce a bus load. In this case, data traffic per unit time may be reduced with use of the way such that an actual page read rate is changed in the reading processing, an actual page print rate is changed in the print processing, or the like.

Figure 3:
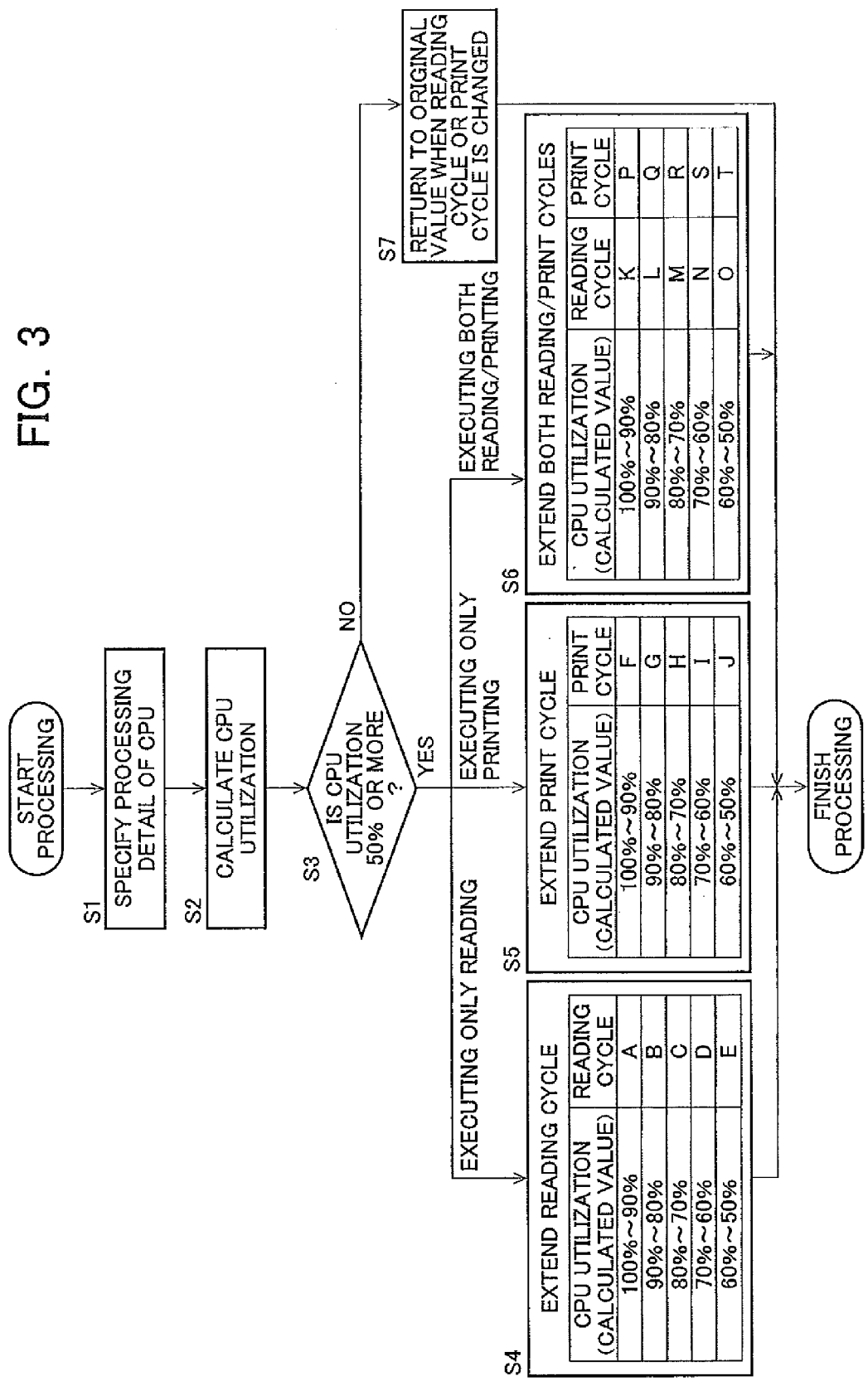
FIG. 3 is a flowchart for explaining an example of a method of controlling a CPU load in the MFP of the present invention.

FIG. 3 is a flowchart for explaining an example of a method of controlling a CPU load in the MFP 10 of the present invention. In this example, description will be given for a configuration of the MFP 10 of FIG. 1 and the CPU utilization table of FIG. 2. First, the CPU utilization monitoring portion 21a specifies a processing detail of the CPU 21 at the time of accepting various processing (step S1). In the processing detail of the CPU 21, for example, when the scan processing is accepted, in a case where other processing, for example, the preview processing or the like is executed at the time, the scan processing and the preview processing are specified. Such processing is performed not only when the scan processing is accepted but also when the print processing and the copy processing are accepted.

Then, the CPU utilization monitoring portion 21a calculates, based on the CPU processing detail specified above, the CPU utilization corresponding to the processing detail of the CPU 21 with reference to the CPU utilization table of FIG. 2 (step S2). For example, in the case of the scan processing at the CPU utilization of 20% and the preview processing at the CPU utilization of 40%, the utilization in these processing is added so that the CPU utilization is calculated as 60%. Similarly, in the case of the print processing at the CPU utilization of 10% and the preview processing at the CPU processing of 40%, the utilization in these processing is added so that the CPU utilization is calculated as 50%. Further, in the case of the copy processing at the CPU utilization of 30% and the preview processing at the CPU utilization of 40%, the utilization in these processing is added so that the CPU utilization is calculated as 70%.

Next, the operating condition restriction portion 21b refers, in the case of judging whether or not the CPU utilization that is monitored by the CPU utilization monitoring portion 21a is a predetermined value (here, 50%) or more (step S3) and judging that the CPU utilization is 50% or more (in the case of YES), and in the case of judging processing being executed and as a result, judging that reading in the scanner unit 1 is only executed (in the case of executing only reading), to the reading cycle table (illustrated) in the ROM 22 to specify the reading cycle corresponding to the CPU utilization based on the CPU utilization that is calculated at step S2. Then, the CPU 21 controls the scanner unit 1 so as to operate in the specified reading cycle (step S4).

Further, in the case of executing only printing at the printer unit 3 (in the case of executing only printing), the print cycle table (illustrated) in the ROM 22 is referenced to specify the print cycle corresponding to the CPU utilization based on the CPU utilization that is calculated at step S2. Then, the CPU 21 controls the printer unit 3 so as to operate in the specified print cycle (step S5). Additionally, when both reading at the scanner unit 1 and printing at the printer unit 3 are executed (in the case of executing both reading/printing), the reading/print cycle table (illustrated) in the ROM 22 is referenced to specify the reading cycle and the print cycle corresponding to the CPU utilization based on the CPU utilization that is calculated at step S2. Then, the CPU 21 controls the scanner unit 1 and the printer unit 3, respectively, so as to operate in the specified reading cycle and print cycle (step S6).

Then, the operating condition restriction portion 21b returns, in the case of judging that the CPU utilization is less than 50% at step S3 (in the case of NO) and in a case where the reading cycle or the print cycle is changed, the value to an original value (default value) (step S7), then finishes the process.

FIG. 4 is a flowchart for explaining an example of a method of controlling a CPU load and a bus load in the MFP 10 of the present invention. In this example, description will be given based on the configuration of the MFP 10 of FIG. 1 and the CPU utilization table of FIG. 2, in which load control is assumed to be performed also in consideration of bus band utilization that is monitored at the bus band utilization monitoring portion 21c. First, the CPU utilization monitoring portion 21a specifies the processing detail of the CPU 21 at the time of accepting various processing (step S11). In the processing detail of the CPU 21, for example, when the scan processing is accepted, in a case where other processing, for example, the preview processing or the like is executed at the time, the scan processing and the preview processing are specified. Such processing is performed not only when the scan processing is accepted but also the print processing and the copy processing are accepted.

Then, the CPU utilization monitoring portion 21a calculates, based on the CPU processing detail specified above, the CPU utilization corresponding to the processing detail of the CPU 21 with reference to the CPU utilization table of FIG. 2, and the bus band utilization monitoring portion 21c also calculates the bus band utilization of the bus 30 (step S12).

Next, the operating condition restriction portion 21b specifies, in the case of judging whether or not the CPU utilization that is monitored by the CPU utilization monitoring portion 21a is a predetermined value (here, 50%) or more (step S13) and judging that the CPU utilization is 50% or more (in the case of YES), and in the case of judging processing being executed and as a result, judging that reading in the scanner unit 1 is only executed (in the case of executing only reading) as with the flow of the FIG. 3, the reading cycle corresponding to the CPU utilization calculated at step S12. Then, the CPU 21 controls the scanner unit 1 so as to operate in the specified reading cycle (step S15).

Further, in the case of executing only printing at the printer unit 3 (in the case of executing only printing), the print cycle is specified corresponding to the CPU utilization calculated at step S12. Then, the CPU 21 controls the printer unit 3 so as to operate in the specified print cycle (step S16). Additionally, when both reading at the scanner unit 1 and printing at the printer unit 3 are executed (in the case of executing both reading/printing), the reading cycle and the print cycle are specified corresponding to the CPU utilization calculated at step S12. Then, the CPU 21 controls the scanner unit 1 and the printer unit 3, respectively, so as to operate in the specified reading cycle and print cycle (step S17).

Further, when the CPU utilization is judged to be less than 50% at step S13 (in the case of NO), the operating condition restriction portion 21b specifies, in the case of judging whether or not the bus band utilization that is monitored by the bus band utilization monitoring portion 21c is a certain value (here, 70%) or more (step S14) and judging that the bus band utilization is 70% or more (in the case of YES), and in the case of judging processing being executed and as a result, only reading at the scanner unit 1 is executed (in the case of executing only reading), the reading cycle corresponding to the bus band utilization calculated at step S12. Then, the CPU 21 controls the scanner unit 1 so as to operate in the specified reading cycle (step S15).

Here, in the case of specifying the reading cycle corresponding to the bus band utilization, not the table in which the CPU utilization is associated with the reading cycle as shown in FIG. 3 but a table in which the bus band utilization is associated with the reading cycle is assumed to be used. Hereinafter, it is assumed that each table is used likewise also in the case of the print cycle and the case of the reading cycle as well as the print cycle.

Further, in the case of executing only printing at the printer unit 3 (in the case of executing only printing), the print cycle is specified corresponding to the bus band utilization calculated at step S12. Then, the CPU 21 controls the printer unit 3 so as to operate in the specified print cycle (step S16). Additionally, when both reading at the scanner unit 1 and printing at the printer unit 3 are executed (in the case of executing both reading/printing), the reading cycle and the print cycle are specified corresponding to the bus band utilization calculated at step S12. Then, the CPU 21 controls the scanner unit 1 and the printer unit 3, respectively, so as to operate in the specified reading cycle and print cycle (step S17).

Then, the operating condition restriction portion 21b returns, in the case of judging that the bus band utilization is less than 70% at step S14 (in the case of NO) and in a case of where the reading cycle or the print cycle is changed, the value to an original value (default value) (step S18), then finishes the process.

As described above, according to the present invention, the CPU utilization at the time of performing the reading processing and/or the print processing is monitored, and when the CPU utilization is a predetermined value (for example, 50%) or more, an operating condition related to the reading processing and/or the print processing is restricted corresponding to the CPU utilization, thus making it possible to suppress degradation of responsiveness of a UI without temporarily stopping reading processing or print processing in the case of becoming a high load on a CPU.

The invention claimed is:

1. An image forming apparatus including a reading portion for optically reading a document image and a printing portion for printing image data, comprising:
    a CPU for controlling operation of the image forming apparatus according to an operating condition related to reading processing by the reading portion and/or print processing by the printing portion;
    a CPU utilization monitoring portion for monitoring utilization of the CPU at the time of performing the reading processing and/or the print processing; and
    an operating condition restriction portion for restricting, when CPU utilization that is monitored by the CPU utilization monitoring portion is a predetermined value or more, the operating condition related to the reading processing and/or the print processing according to the CPU utilization.

2. The image forming apparatus as defined in claim 1, wherein
    a CPU utilization table in which a processing detail is associated with the CPU utilization in the image forming apparatus is provided, and the CPU utilization monitoring portion calculates, based on a processing detail of the image forming apparatus at the time of performing the reading processing and/or the print processing, the CPU utilization corresponding to the processing detail with reference to the CPU utilization table.

3. The image forming apparatus as defined in claim 1, wherein
    a bus that is connected to the CPU and a bus band utilization monitoring portion for monitoring band utilization of the bus at the time of performing the reading processing and/or the print processing are provided, and the operating condition restriction portion restricts, when the CPU utilization is less than the predetermined value and bus band utilization that is monitored by the bus band utilization monitoring portion is a predetermined value or more, an operating condition related to the reading processing and/or the print processing according to the bus band utilization.

4. The image forming apparatus as defined in claim 1, wherein
    restriction of the operating condition related to the reading processing and/or the print processing is to extend a reading cycle in the reading processing and/or a print cycle in the print processing with respect to a default value.

5. The image forming apparatus as defined in claim 4, wherein
    the operating condition restriction portion differentiates the amount for extending the reading cycle in a case where the reading cycle is extended between the case of extending only the reading cycle and the case of extending both the reading cycle and the print cycle.

* * * * *